April 5, 1927.  
R. E. MITTON  
1,623,126  
DIAPHRAGM VALVE  
Filed July 3, 1926

Inventor  
Robert E. Mitton  
By R. M. Thomas.  
Attorney

Patented Apr. 5, 1927.                                      1,623,126

UNITED STATES PATENT OFFICE.

ROBERT E. MITTON, OF SALT LAKE CITY, UTAH.

DIAPHRAGM VALVE.

Application filed July 3, 1926. Serial No. 120,345.

My invention relates to valves for the control of fluids and has for its object to provide a new and efficient valve for the control of air in the operation of air brakes or similar purposes.

A further object is to provide an air valve for controlling air which will allow any desired amount of air to pass therethrough and which can be adjusted to allow the minimum flow of air or a large amount, as desired.

A still further object is to provide an air valve for the controlling of air or other like fluids in any desired line where such fluid is the power used to operate mechanical movements and where varied amounts of pressure may be necessary.

These objects I have accomplished with the invention shown in the accompanying drawings in which similar numerals and letters of reference indicate like parts throughout the several views and as described in the specification forming a part of this application and pointed out in the appended claims.

Figure 1:
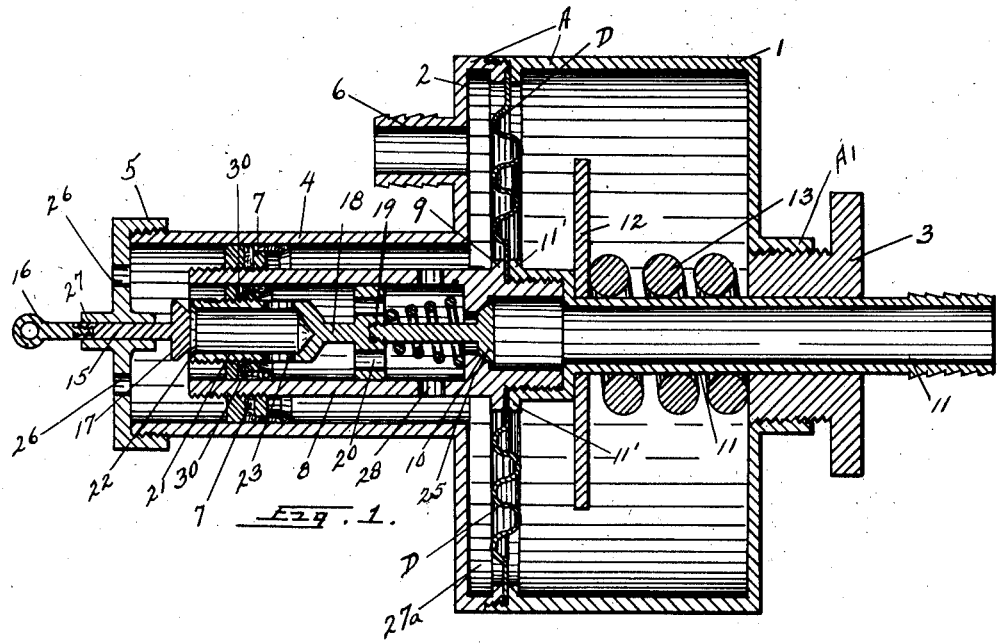
Figure 2:
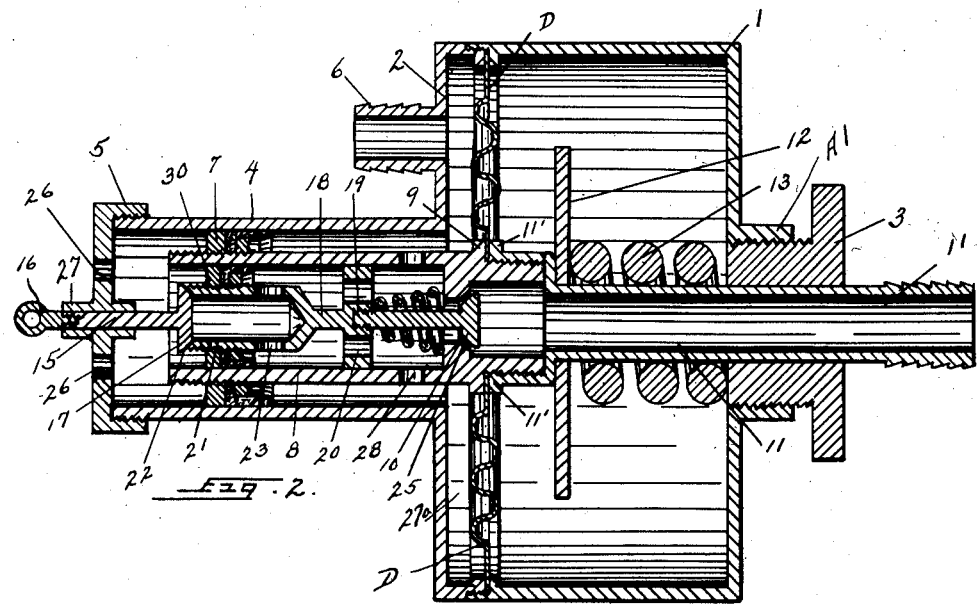

In the drawings in which I have shown the best and most preferred embodiment of invention and method of constructing my device, Figure 1 is a diametrical section of the valve when closed and before operation has taken place. Figure 2 is a diametrical section of the same with a partial operation of the valves shown.

In the drawings I have shown the casing in which the valve is assembled and operated as A. The said casing is composed of two cylindrical members 1 and 2 which have their ends partially closed. A flange A¹ is centrally provided on the bottom of the member 1 and is internally threaded to receive an adjusting nut 3. The other member 2 has its greatest portion reduced in size to form a smaller cylindrical casing 4, which is externally threaded at its outer end to receive the cap 5. An air connection 6 is provided in one side of the said member 2 to which the delivery air line, not shown, is connected. A suitably packed piston 7 is longitudinally operable and carried within the said casing 4 and the connecting rod of said piston 7 is made of a tubular casing 8 which has a flange 9 near one end and has external threads cut on both the extreme ends thereof. The bore of said tubular casing 8 is partially closed near its flanged end to form a valve seat 10 therein. Another longitudinally slidable rod or tube 11 is screwed on the threaded end of the casing 8 adjacent the flange 9 and has a washer 12 thereon which bears against a spring 13 carried around said tube 11. The outer end of the said tube 11 passes centrally through the adjusting nut 3 and is connected with the air supply. The said nut 3 and the washer 12 carry the spring 13 between them, and it bears at all times on the adjacent faces of both of them. The tension of the spring can be varied and regulated by screwing the nut 3 in or out of the flange A¹ on the casing. A diaphragm D is carried between the flange 9 and a flange 11' provided on the tube 11 and is mounted between the two abutting edges of the members 1 and 2 where they are screwed together. The cap 5 over the end of the casing 4 has a central bearing or hub portion 27 formed on each side thereof and which is centrally bored to carry a valve stem 15 which is passed therethrough. The outer end of the said stem is internally threaded to receive a suitable clevis or eye bolt 16 as desired, and which is operatively connected with a suitable lever for operating the valve. The other end of the said stem 15 has a valve plug 17 formed thereon. Another valve stem 18 is longitudinally carried within the tubular casing 8 by its enlarged guide portion 19 formed medially thereon. The said guide 19 is slidably operated within the tubular casing 8 and is bored or perforated by the ports 20 to allow passage of air therethrough. One end of the said valve stem 18 is enlarged and bored, as at 21, and has a valve seat 22 cut on its end thereof. The said valve stem 18 is supported at its outer end and carried longitudinally slidable within the tubular casing 8 by the piston 30, which is suitably packed to prevent passage of air around it. The said valve plug 17 seats within the seat 22 when the valve is operated. Ports 23 are cut in the enlarged portion 21 of the stem 18 to allow passage of air. The other end of the said valve stem 18 is enlarged to form a valve head 25 which seats normally within the valve seat 10 in the casing 8. A spring 35 is provided around the valve stem 18 to hold the valve 25 normally closed. Ports 26 are cut in the cap 5 to allow escapement of air from the valve when it is released.

The operation of my device is as follows:—

When air is desired through the device, the lever is pressed and the valve stem 15 slid inwardly, which presses the valve plug 17 into its seat 22 and closes the end of the portion 21. A further longitudinal movement of stem 15 will move the portion 21 and stem 18 and, as the said stem 18 is slid within the tubular casing 8, the valve 25 is opened and air from the source of supply is allowed to enter the chamber 27$^a$ through the valve seat 10, the ports 28 in the tubular casing 8 and from the chamber 27$^a$ the air is directed to the desired place of application, through the connection 6. When the brake or other object to be actuated by the air has been moved, the air will build up a back pressure in the air line and in the chamber 27$^a$ and will move the piston 7 longitudinally in the casing 4 and will flex the diaphragm D, closing off the air supply through the connection tube 11, and opening the air valve 17. As the piston 7 is screwed on the tubular casing 8, when the said piston is moved longitudinally, the tubular casing 8 is moved, the tube 11 and flanges 9 and 11', will be moved, and the air valve 17 will be opened, and the compressed or back pressure air will pass through the ports 28, the casing 8, the ports 20 and 23, and through the portion 21, and out to the open air through the ports 26. The amount of air used may be regulated by the distance that the valve 25 is opened. The piston 30 and its packing prevent the air from passing out through the casing 8 and escaping therefrom. The amount of air necessary to move the diaphragm D may be regulated by the adjusting nut 3 and the spring 13.

Having thus described my invention I desire to secure by Letters Patent and claim:

1. In a valve the combination of a casing having one end of less diameter than the other; a diaphragm mounted in the large end of said casing; a piston longitudinally movable in said smaller portion; a tubular casing secured to said piston and to said diaphragm; a tube secured to the diaphragm end of said tubular casing and connected with the air supply; a valve seat cut in said tubular casing; a guide member longitudinally movable in said tubular casing; a valve plug connected with the guide member; and a piston secured to said guide member and carried in said tubular casing.

2. In a valve the combination of a casing having one end of less diameter than the other; a diaphragm mounted in the large end of said casing; a piston longitudinally movable in said smaller portion; a tubular casing secured to said piston and to said diaphragm; a tube secured to the diaphragm end of said tubular casing and connected with the air supply; a valve seat cut in said tubular casing; a guide member longitudinally movable in said tubular casing; a valve plug connected with the guide member; a piston secured to said guide member and carried in said tubular casing; and means to operate said valves.

3. In a valve the combination of a casing having one end of less diameter than the other; a diaphragm mounted in the large end; a piston longitudinally movable in said smaller portion; a tubular casing secured to said piston and said diaphragm; a spring to regulate the movement of said diaphragm and piston; an adjusting nut to regulate the pressure of said spring; a valve seat cut in said tubular casing; a guide member carried in said tubular casing; a valve stem secured to said guide member and having a valve on one end to seat in said valve seat; a valve seat cut in said guide member; a piston secured to said guide member and carried within said tubular casing; and a valve controlled manually to close the valve seat in said guide member.

4. In a valve the combination of an intake and exhaust valve mechanism; a cylindrical casing and a piston operable therein; a diaphragm mounted in said casing; a spring in said casing to hold said diaphragm in a predetermined position; and means to manually apply and automatically cut off varying pressures of air on said valves dependent on the distance of manual application.

5. In a valve the combination of a casing; a diaphragm mounted in said casing; a spring to regulate the movement of said diaphragm; a hollow piston rod attached to said diaphragm; valves operable within said piston rod; means to convey compressed air against the face of said diaphragm; and means to manually operate the valves to allow varying air pressure to pass them.

6. In a valve the combination of a casing; a diaphragm mounted in said casing dividing the interior of said casing into parts; a spring in one compartment to regulate the movement of said diaphragm; a hollow piston rod attached to said diaphragm; co-acting valve stems operable within said piston rod; a valve on each of said stems; and means to direct compressed air through said casing and hollow rod in either direction.

7. In a valve the combination of an intake and exhaust valve mechanism; a cylindrical casing and a piston operable therein, against a spring tension; a diaphragm mounted in said casing between a spring carried in said casing and said piston; and means to manually apply and automatically cut off varying pressures of air on said valves dependent on the distance of manual application.

In testimony whereof I have affixed my signature.

ROBERT E. MITTON.